United States Patent [19]

Pickering et al.

[11] Patent Number: 4,956,428

[45] Date of Patent: Sep. 11, 1990

[54] RATE-MODERATED GROUP TRANSFER POLYMERIZATION

[75] Inventors: Anthony Pickering, Kingsley; Andrew J. Thorne, Upton; Peter J. I. Runciman, Newton, all of United Kingdom

[73] Assignee: Imperial Chemical Industries PLC, London, United Kingdom

[21] Appl. No.: 311,049

[22] Filed: Feb. 16, 1989

[30] Foreign Application Priority Data

Feb. 18, 1988 [GB] United Kingdom ................. 8803765

[51] Int. Cl.$^5$ ............................................... C08F 4/44
[52] U.S. Cl. ..................................... 526/190; 526/194; 526/126; 526/262; 526/329.7
[58] Field of Search ............... 526/190, 194, 126, 262, 526/329.7

[56] References Cited

U.S. PATENT DOCUMENTS

| | | | |
|---|---|---|---|
| 4,417,034 | 11/1983 | Webster | 526/190 |
| 4,524,196 | 6/1985 | Farnham | 526/194 |
| 4,791,181 | 12/1988 | Pickering et al. | 526/194 |

*Primary Examiner*—Joseph L. Schofer
*Assistant Examiner*—Alex H. Walker
*Attorney, Agent, or Firm*—Cushman, Darby & Cushman

[57] ABSTRACT

A polymerization process which comprises contacting at least one polar acrylic type or maleimide monomer under polymerization conditions with (i) a tetracoordinate organosilicon, organotin or organogermanium initiator having at leasst one initiating site and (ii) a co-catalyst which is a complex obtained by the interaction of a source of fluoride, bifluoride, cyanide or azide ions or a Lewis acid with a complexing agent.

4 Claims, No Drawings

RATE-MODERATED GROUP TRANSFER POLYMERIZATION

This invention relates to a polymerisation process and more particularly to a process for polymerising polar olefinic monomers.

The group transfer polymerisation of acrylic type and maleimide monomers using certain organosilicon, organotin or organogermanium initiators and co-catalysts which are Lewis acids or sources of fluoride, bifluoride, cyanide or azide ions has been described in U.S. Pat. Nos. 4414372 and 4417034. The products are said to be "living" polymers by which is meant polymers which contain at least one active terminal group and are capable of polymerising further in the presence of mononmer(s) and co-catalyst.

Whilst solvents are said to be not essential, it is acknowledged in the above mentioned patents that they are beneficial in controlling temperature during the exothermic polymerisations. In fact, in the absence of solvents, the rate of polymerisation is extremely high and hitherto the group transfer polymerisation technique has been of no practical value in bulk polymerisation processes.

It has now been found that the rate of polymerisation in group transfer polymerisation processes can be moderated by using the co-catalyst in the form of a complex. By contrast, the rate of polymerisation cannot be satisfactorily controlled by merely reducing the concentration of the initiator or the co-catalyst.

Accordingly, the invention provides a polymerisation process which comprises contacting at least one polar acrylic type or maleimide monomer under polymerisation conditions with (i) a tetracoordinate organosilicon, organotin or organogermanium initiator having at least one initiating site and (ii) a co-catalyst which is a complex obtained by the interaction of a source of fluoride, bifluoride, cyanide or azide ions or a Lewis acid with a complexing agent.

Monomers which may be polymerised by the process of the invention include monomers of the formula:

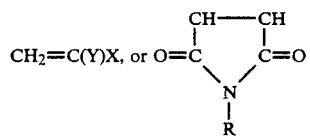

wherein:
X is CN, —CH=CHC(O)X' or —C(O)X';
Y is —H, —CH$_3$, —CN or —CO$_2$R, provided, however, when
X is —CH=CHC(O)X', Y is —H or —CH$_3$;
X' is —OSi(R$^1$)$_3$, —R, —OR or —NR'R''; each R$^1$ independently is H or a hydrocarbyl radical which is an aliphatic, alicyclic, aromatic or mixed aliphatic-aromatic radical containing up to 20 carbon atoms, provided that at least one R$^1$ group is not H;
R is a hydrocarbyl radical which is an aliphatic, alicyclic, aromatic or mixed aliphatic-aromatic radical containing up to 20 carbon atoms, or a polymeric radical containing at least 20 carbon atoms, any of said radicals optionally containing one or more ether oxygen atoms within aliphatic segments thereof and optionally containing one or more functional substituents that are unreactive under polymerizing conditions, and optionally containing one or more reactive substituents of the formula:

—Z'(O)C—C(Y')=CH$_2$ wherein

Y' is H or CH$_3$ and Z' is O or NR';
and
each of R' and R'' is independently selected from C$_{1-4}$ alkyl.

As indicated above in the definition of R in the formulas for the monomer, substituents having oxygen-nitrogen- or silicon-containing groups which are devoid of reactive hydrogen atoms under polymerizing conditions may be used. Groups such as OSi(R$^1$)$_3$ and CONH$_2$ are nonreactive under such conditions and therefore can be tolerated. On the other hand, groups such as CO$_2$H and OH are reactive under polymerizing conditions. In order for monomers containing such groups on the R substituent to be useful in the invention process, the groups must be chemically protected, i.e. deactivated. Monomers containing such deactivated groups are useful in the preparation of polymers which upon treatment to remove the protective group, have functional sites along the polymer chain. Monomers which contain sufficiently sterically hindered amine and alcohol groups that remain inert under reactive conditions may be used directly without deactivation.

Examples of specific monomers which may be used in the process of the invention include methyl methacrylate, butyl methacrylate; sorbyl acrylate and methacrylate, lauryl methacrylate; ethyl acrylate; butyl acrylate, acrylonitrile; methacrylonitrile; 2-ethylhexyl methacrylate; 2-(dimethylamino)ethyl methacrylate; 2-(dimethylamino)ethyl acrylate; 3-methacryloxypropyl acrylate; 2-acetoxyethyl methacrylate; p-tolyl methacrylate; 2,2,3,3, 4,4,4-heptafluorobutyl acrylate; methylene malononitrile; ethyl 2-cyanoacrylate,N,N-dimethyl acrylamide,4-fluorophenyl acrylate; 2-methylacryloxyethyl acrylate and linoleate; propyl vinyl ketone; ethyl 2-chloroacrylate; glycidyl methacrylate; 3-methoxypropyl methacrylate; 2[(1-propenyl)oxy]ethyl methacrylate and acrylate; phenyl acrylate; 2-(trimethylsiloxy)ethyl methacrylate,allyl acrylate; and methacrylate. Preferred monomers include methyl methacrylate; glycidyl methacrylate,sorbyl methacrylate; ethyl acrylate butyl acrylate; sorbyl acrylate; 2-(trimethylsiloxy)ethyl methacrylate; 2-methacryloxyethyl acrylate, 2-acetoxyethyl methacrylate and 2-(dimethylamino)ethyl methacrylate. Methyl methacrylate is especially preferred. Mixtures of two or more monomers may be used if desired.

Tetracoordinate organosilicon, organotin or organogermanium initiators which may be used in the process of the invention include any of those disclosed in U.S. Pat. Nos. 4414372 and 4417034 or in European Patent publication Nos. 191641 and 194110, the disclosures of which are incorporated herein by reference.

Examples of specific initiators which are useful in the invention process include [(1-methoxy-2-methyl-1-propenyl)oxy]trimethylsilane; 2-(trimethylsilyl)isobutyronitrile; ethyl 2-(trimethylsilyl)acetate: methyl 2-methyl-2-(tributylstannyl)propanoate; [(2-methyl-1-cyclohexenyl)oxy]tributylstannane; trimethylsilyl nitrile; methyl 2-methyl-2-(trimethylgermanyl)propanoate; [4,5-dihydro-2-furanyl)oxy]trimethylsilane; [(2-methyl-1propenylidene)bis(oxy)]bis[-trimethylsilane]; [(2-methyl-1-[2-(methoxymethoxy)ethoxy]-1-propenyl)oxy]trimethylsilane; methyl [(2-methyl-1-(trimethylsilyloxy)-1-propenyl)oxy]acetate; [(1-(methoxymethoxy)-2-methyl-1-propenyl)oxy]trimethylsilane; trimethyl a,a'a"-tris(trimethylsilyl)-1,3,5-benzenetriacetate; dimethyl a,a'-bis(trimethylsilyl)-1,3-benzenediacetate; [1,6-dimethoxy-1,5-hexadiene-1,6-diylbis(oxy)]bis[-trimethylsilane]; [(2-ethyl-1-propoxy-1-butenyl)oxy]ethyldimethylsilane; ethyl 2-(trimethylstannyl)propanoate; [(1-cyclohexenyl)oxy]trimethylstannane [(2-methyl-1-butenylidene)bis(oxy)]bis[trimethylsilane]; 2-(trimethylsilyl)propanenitrile; ethyl(trimethylgermanyl)acetate; [(1-((1-dec-2-enyl)oxy)-2-methyl-1-propenyl)oxy]trimethylsilane; phenyl 2-methyl-2-(tributylstannyl)propanoate; methyl 2-(triethylsilyl)acetate; dimethyl 2,5-bis(trimethylgermanyl)hexanedioate; [(2-methyl-1-cyclohexenyl)oxy]tributylstannane; [(1-methoxy-2-methyl-1-propenyl)oxy]phenyldimethylsilane; and [(2-methyl-1-[2-(trimethylsiloxy)ethoxy]-1-propenyl)oxy]trimethylsilane. Preferred initiators include [(1-methoxy-2-methyl-1-propenyl)oxy]trimethylsilane.

Suitable concentrations of initiator are generally such that the monomer/initiator molar ratio is greater than 1, preferably greater than 5.

The co-catalysts used in the invention process may be obtained by reacting a complexing agent, with a source of fluoride, bifluoride, cyanide or azide ions for example tris (dimethylamino) sulphonium bifluoride, tris(dimethylamino)sulphonium cyanide, tetraphenylarsonium cyanide,tris(dimethylamino) sulphonium azide, tetraethylammonium azide, bis(dialkylaluminium)oxides, boron trifluoride etherate, alkali metal fluorides, bifluorides, cyanides, and azides, ammonium bifluoride, tris(-dimethylamino)sulphoniumdifluorphenylstannate, tetrabutylammonium fluoride and bifluoride, tetramethylammonium fluoride and bifluoride tetraethylammonium cyanide and bifluoride and tetraphenylphosphonium bifluoride.

Suitable complexing agents for use in making the co-catalysts are active hydrogen compounds capable of forming isolatable hydrogen bonded complexes with the said source of fluoride, bifluoride, cyanide or azide ions. Such complexes may be formed by mixing the active hydrogen compound with the ionic material in a suitable solvent such as acetonitrile.

Examples of active hydrogen compounds which may be employed as complexing agents include alcohols, for example triphenylmethanol, phenols, for example 2,6-di-tert.butyl-4-methylphenol, 4-cyanophenol and methyl p-hydroxybenzoate, amines, for example uracil, carboxylic acids, for example acetic acid, diketones, for example acetylacetone and hexamethylacetylacetone and oximes, for example those of camphor, acetophenone and butane-2,3-dione.

Preferred active hydrogen compounds for use in making the complexes include acetylacetone and hexamethylacetylacetone.

Preferred ionic species for use in making the complexes are fluorides such as tetrabutylammonium fluoride.

The co-catalyst is suitably present in an amount such that the molar ratio of initiator to co-catalyst is in the range 0.1 to 500, preferably 1 to 10.

It is often useful to have additional complexing agent present in the polymerisation mixture over and above that which is present in complex form in the co-catalyst so as to delay the start of polymerisation. Agents having this effect include the above mentioned complexing agents, water, dimethyl sulphoxide and dimethyl formamide.

It is also useful, in order to moderate the polymerisation further, for the reaction mixture to contain from 0.01 to 2.0% by weight, based on the weight of monomer, of acetonitrile.

The method of the invention may suitably be performed at temperatures in the range from 0° to 100° C. but is preferably performed at or about ambient temperature. In one preferred form of the invention the monomer, or mixture of monomers, is added to a mixture of initiator, co-catalyst and any other agents in a suitable polymerisation vessel.

The "living" polymer obtained by the method of the invention may be converted to a non-living polymeric product by being contacted with an active hydrogen compound, for example water or an alcohol.

The method of the invention is particularly useful for the bulk polymerisation of acrylics at room temperature, optionally in the presence of fillers, for the production of sheets, rods etc.

Dispersion type polyacrylates may also be prepared.

The invention is illustrated but not limited by the following Examples.

EXAMPLE 1

Polymerisation of methyl methacrylate (MMA) initiated by
[(1-methoxy-2methyl-1-propenyl)oxy]trimethyl silane (MTS) and tetrabutyl ammonium fluoride/acetylacetone complex 3 mls of MMA (28.1 mmol) and 10 μl MTS (4.95×10$^{-2}$ mM) were added to a dry glass reaction vessel under N$_2$. Whilst stirring, 5 μl of TBAF/AcAc in THF (0.05 mmol/ml) were added using a microlitre syringe. The polymerisation rate was followed by monitoring the temperature using a thermocouple.

The mixture gradually increased from room temperature up to 90° C. in 8 minutes. The polymerisation was allowed to proceed for a further 10 mins when the mixture was quenched in moist methylene chloride and precipitated into hexane.

A conversion of 81.9% was obtained Mn 66680, Mw 110889, D 1.6.

EXAMPLE 2

Polymerisation of methyl methacrylate (MMA) initiated by
[(1-methoxy-2-methyl-1-propenyl)oxy]trimethyl silane and tetrabutyl ammonium fluoride/acetyl acetone complex (TBAF/AcAc) in the presence of dimethyl malonate (DMM)

4×10$^{-3}$ mM TBA/AcAc and 10 ml MMA (93.6 mmol) were added to a dry glass reaction vessel under N2 1 μl of DMM (0.012 mmol) was now added followed by 20 μl MTS (0.0488 mmol). The polymerisation rate was followed by monitoring the exotherm.

There was an initial induction time of 7 mins after which the reaction was very fast with a consequential exotherm to above 100° C.

Polymerisation assumed to be >90% conversion with polymer Mn 258330 Mw 635270 D 2.46.

EXAMPLE 3

Polymerisation of MMA initiated by MTS and TBAF/AcAc in the presence of Dimethyl sulphoxide (DMSO)

TBAF/AcAc ($2.5 \times 10^{-4}$ mmol), MMA (28.1 mmol) and 1 μl DMSO (0.0141 mmol) were added to a dry reaction vessel 10 μl of MTS was now added.

A 6 min induction time was noted followed by a very rapid polymerisation rate. 85.5% of monomer was converted to polymer Mn 84790, Mw 126390, D 1.49.

EXAMPLE 4

Polymerisation of MMA initiated by MTS and TBAF/AcAc in the presence of dimethyl formamide (DMF)

$2.5 \times 10^{-4}$ mmol TBAF/AcAc, 28.1 mM TBAF and 1 μl of DMF (0.013 mmol) were added to a dry reaction vessel. After addition of 10 μl MTS (0.0494 mmol), an induction time of 3 mins was noted.

A vigorous exotherm then occurred giving 86.5% conversion Mn 85900, Mw 129730, D 1.5.

EXAMPLE 5

Polymerisation of MMA initiated by MTS and TBAF/AcAc in the presence of water.

$2 \times 10^{-3}$ mmol TBAF/AcAc, 46.8 mM MMA and 0.0139 mm of $H_2O$ were added to a reaction vessel under $N_2$.

After the addition of 0.0494 mmol of MTS, an induction time of 5 mins was noted. A vigorous exotherm then occurred yielding polymer Mn 316320, Mw 608710, D 1.92.

EXAMPLES 6–19

To the purified monomer (5g) was added MTS ($2.5 \times 10^{-4}$ moles, $5 \times 10^{-2}$ ml). The ingredients were allowed to mix thoroughly before the co-catalyst complex was added. There was then a brief induction period of 1–5 minutes in the case of MMA polymerisation. When ethyl acrylate (EA) was used, there was no induction period. The co-catalysts used (as a 0.1M solution in tetrahydrofuran) are identified in the following Table together with the amounts used.

The polymers obtained were dissolved in $CH_2Cl_2$ and purified by precipitation into a suitable non-solvent such as methanol. The polymers were dried and weighed Yields and GPC results are given in the Table.

| Example | Monomer | Co-catalyst | 0.1 Min | Yield | Mn | Mw/Mn |
|---|---|---|---|---|---|---|
| 6 | MMA | 1 | 20 μl | 84% | 22350 | 1.9 |
| 7 | MMA | 2 | 10 μl | 89% | 18500 | 1.4 |
| 8 | MMA | 3 | 10 μl | 83.2% | 17620 | 1.6 |
| 9 | MMA | 4 | 10 μl | 89.5% | 21930 | 1.5 |
| 10 | MMA | 5 | 15 μl | 73.6% | 23700 | 2.7 |
| 11 | MMA | 6 | 20 μl | 63.2% | 24500 | 1.9 |
| 12 | MMA | 7 | 20 μl | 69.5% | 19950 | 2.3 |
| 13 | MMA | 8 | 15 μl | 87.4% | 26370 | 2.35 |
| 14 | MMA | 9 | 10 μl | 89.5% | 17750 | 1.6 |
| 15 | EA | 9 | 10 μl | 82.8% | 21120 | 1.9 |
| 16 | EA | 2 | 15 μl | 81.2% | 31620 | 2.6 |
| 17 | MMA | 10 | 10 μl | 83.6% | 25820 | 1.4 |
| 18 | MMA | 11 | 15 μl | 87.8% | 21220 | 1.42 |
| 19 | EA | 11 | 5 μl | 81.6% | 17620 | 1.9 |

The co-catalysts identified by numbers in the above Table were obtained by reacting tetrabutylammonium fluoride with the following materials:

1. 2,6-ditert.butyl-4-methylphenol
2. 4-cyanophenol
3. methyl-4-hydroxybenzoate
4. triphenylmethanol
5. acetic acid
6. camphor oxime
7. acetophenone oxime
8. butane-2,3-dione mono-oxime
9. uracil
10. acetylacetone
11. hexamethylacetylacetone

EXAMPLE 20

Control of the rate of polymerisation using low levels of tetrabutyl ammonium fluoride hexamethyl acetylacetone complex

| Materials | 5.0 mls MMA |
| | 8 μl MTS |
| | 0.06 ml fluoride complex (1 ng/ml of MMA) |
| [Monomer]/[INITIATOR] = 1016 | [INITIATOR]/[FLUORIDE] = 350 |

MMA was added to a flask followed by MTS and the fluoride complex solution. A controlled polymerisation occurred whereby 80% polymerisation was obtained after 50 mins. For similar conditions using uncomplexed fluoride, there was either (a) No reaction, or
(b) Slightly higher fluoride concentration yielded very fast local polymerisation with no obvious rate control.

We claim:

1. A polymerisation process which comprises contacting at least one polar acrylic or maleimide monomer under polymerisation conditions with (i) a tetracoordinate organosilicon, organotin or organogermanium initiator having at least one initiating site and (ii) a co-catalyst which is a complex obtained by the interaction of a source of fluoride, bifluoride, cyanide or azide ions or a Lewis acid with a complexing agent which is an active hydrogen compound selected from the group consisting of alcohols, phenols, amines, carboxylic acids, diketones or oximes.

2. A process according to claim 1 wherein the monomer is of the formula:

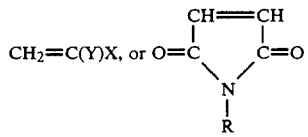

wherein:

X is CN, —CH=CHC(O)X' or —C(O)X';

Y is —H, —$CH_3$ —CN or —$CO_2R$, provided, however, when

X is —CH=CHC(O)X', Y is —H or —$CH_3$;

X' is —OSi($R^1$), —R, —OR or —NR'R''; each $R^1$ independently is H or a hydrocarbyl radical which is an aliphatic, alicyclic, aromatic or mixed aliphatic-aromatic radical containing up to 20 carbon atoms, provided that at least one $R^1$ group is not H;

R is a hydrocarbyl radical which is an aliphatic-aromatic radical containing up to 20 carbon atoms, or a polymeric radical containing at least 20 carbon atoms, any of said radicals optionally containing one or more ether oxygen atoms within aliphatic segments thereof and optionally containing one or more functional substituents that are unreactive under polymerizing conditions, and optionally containing one or more reactive substituents of the formula:

$$-Z'(O)C-C(Y^1)=CH_2$$ wherein $Y^1$ is H or $CH_3$ and $Z^1$ is O or $NR^1$; and each of $R^1$ and $R^{11}$ is independently selected from $C_{1-4}$-alkyl.

3. A process according to claim 2 wherein the monomer is methyl methacrylate.

4. A process according to any preceding claim wherein the co-catalyst is a complex obtained by the interaction of tetrabutylammonium fluoride and acetylacetone or hexamethylacetylacetone.

* * * * *